US009720784B2

(12) United States Patent
Bernal et al.

(10) Patent No.: US 9,720,784 B2
(45) Date of Patent: *Aug. 1, 2017

(54) CLOUD INFRASTRUCTURE BACKUP IN A SHARED STORAGE ENVIRONMENT

(71) Applicant: INTERNATIONAL BUSINESS MACHINES CORPORATION, Armonk, NY (US)

(72) Inventors: Edward Raymond Bernal, Raleigh, NC (US); Rahul Ghosh, Morrisville, NC (US); Ivan M. Heninger, Selma, NC (US); Douglas Alan Larson, Raleigh, NC (US); Aaron James Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/835,852

(22) Filed: Aug. 26, 2015

(65) Prior Publication Data

US 2015/0365478 A1  Dec. 17, 2015

Related U.S. Application Data

(63) Continuation of application No. 14/305,100, filed on Jun. 16, 2014.

(51) Int. Cl.
*G06F 17/30* (2006.01)
*G06F 11/14* (2006.01)
(Continued)

(52) U.S. Cl.
CPC .......... *G06F 11/1461* (2013.01); *H04L 67/10* (2013.01); *H04L 67/1095* (2013.01);
(Continued)

(58) Field of Classification Search
CPC .................................................. G06F 11/1461
See application file for complete search history.

(56) References Cited

U.S. PATENT DOCUMENTS 7,613,747 B1 * 11/2009 Thakur ............... G06F 11/1456
                                                        707/640
8,566,285 B2    10/2013 Altrichter et al.
(Continued)

OTHER PUBLICATIONS

"List of IBM Patents or Patent Applications Treated as Related," Letter from Leslie A. Van Leeuwen, Feb. 16, 2017, 1 page.

*Primary Examiner* — Apu Mofiz
*Assistant Examiner* — Dara J Glasser
(74) *Attorney, Agent, or Firm* — VanLeeuwen & VanLeeuwen; Richard A. Wilhelm

(57) ABSTRACT

A technique for cloud infrastructure backup in a virtualized environment utilizing shared storage includes obtaining a workload input/output (I/O) profile to the shared storage over a time period. An attempt to locate one or more time windows in the workload I/O profile for which a cloud infrastructure backup can be staged is initiated. In response to determining the cloud infrastructure backup can be staged during at least one of the time windows, staging of the cloud infrastructure backup is scheduled during a selected one of the time windows. In response to determining the cloud infrastructure backup cannot be staged during at least one of the time windows, an interference tolerance approach is employed for accessing the shared storage for active workloads and the cloud infrastructure backup during the staging of the cloud infrastructure backup.

9 Claims, 7 Drawing Sheets

(51) Int. Cl.
*H04L 29/08* (2006.01)
*H04L 29/06* (2006.01)

(52) U.S. Cl.
CPC .............. *H04L 67/16* (2013.01); *H04L 67/42* (2013.01); *G06F 2201/815* (2013.01)

(56) References Cited

U.S. PATENT DOCUMENTS

| | | | |
|---|---|---|---|
| 9,336,250 B1* | 5/2016 | Shaikh | G06F 17/30306 |
| 2012/0221683 A1* | 8/2012 | Ferris | H04L 12/4641 |
| | | | 709/218 |
| 2013/0238742 A1* | 9/2013 | Kay | G06F 9/5016 |
| | | | 709/213 |
| 2013/0318046 A1 | 11/2013 | Clifford et al. | |
| 2014/0068187 A1* | 3/2014 | Kitora | G06F 12/0802 |
| | | | 711/118 |
| 2015/0363275 A1* | 12/2015 | Bernal | G06F 11/1461 |
| | | | 707/654 |

* cited by examiner

CLOUD INFRASTRUCTURE BACKUP IN A SHARED STORAGE ENVIRONMENT

This application is a continuation of U.S. patent application Ser. No. 14/305,100, entitled "TECHNIQUES FOR IMPROVING CLOUD INFRASTRUCTURE BACKUP IN A SHARED STORAGE ENVIRONMENT," and filed on Jun. 16, 2014. U.S. patent application Ser. No. 14/305,100 is hereby incorporated herein by reference in its entirety for all purposes.

BACKGROUND

The present invention generally relates to techniques for improving cloud infrastructure backup and, more specifically, to techniques for improving cloud infrastructure backup in a shared storage environment.

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (PM), e.g., a computer system, that executes instructions like a PM. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying PM resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

BRIEF SUMMARY

Disclosed are a method, a data processing system, and a computer program product (embodied in a computer-readable storage medium) for improving cloud infrastructure backup in a shared storage environment.

A technique for cloud infrastructure backup in a virtualized environment utilizing shared storage includes obtaining a workload input/output (I/O) profile to the shared storage over a time period. An attempt to locate one or more time windows in the workload I/O profile for which a cloud infrastructure backup can be staged is initiated. In response to determining the cloud infrastructure backup can be staged during at least one of the time windows, staging of the cloud infrastructure backup is scheduled during a selected one of the time windows. In response to determining the cloud infrastructure backup cannot be staged during at least one of the time windows, an interference tolerance approach is employed for accessing the shared storage for active workloads and the cloud infrastructure backup during staging of the cloud infrastructure backup.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
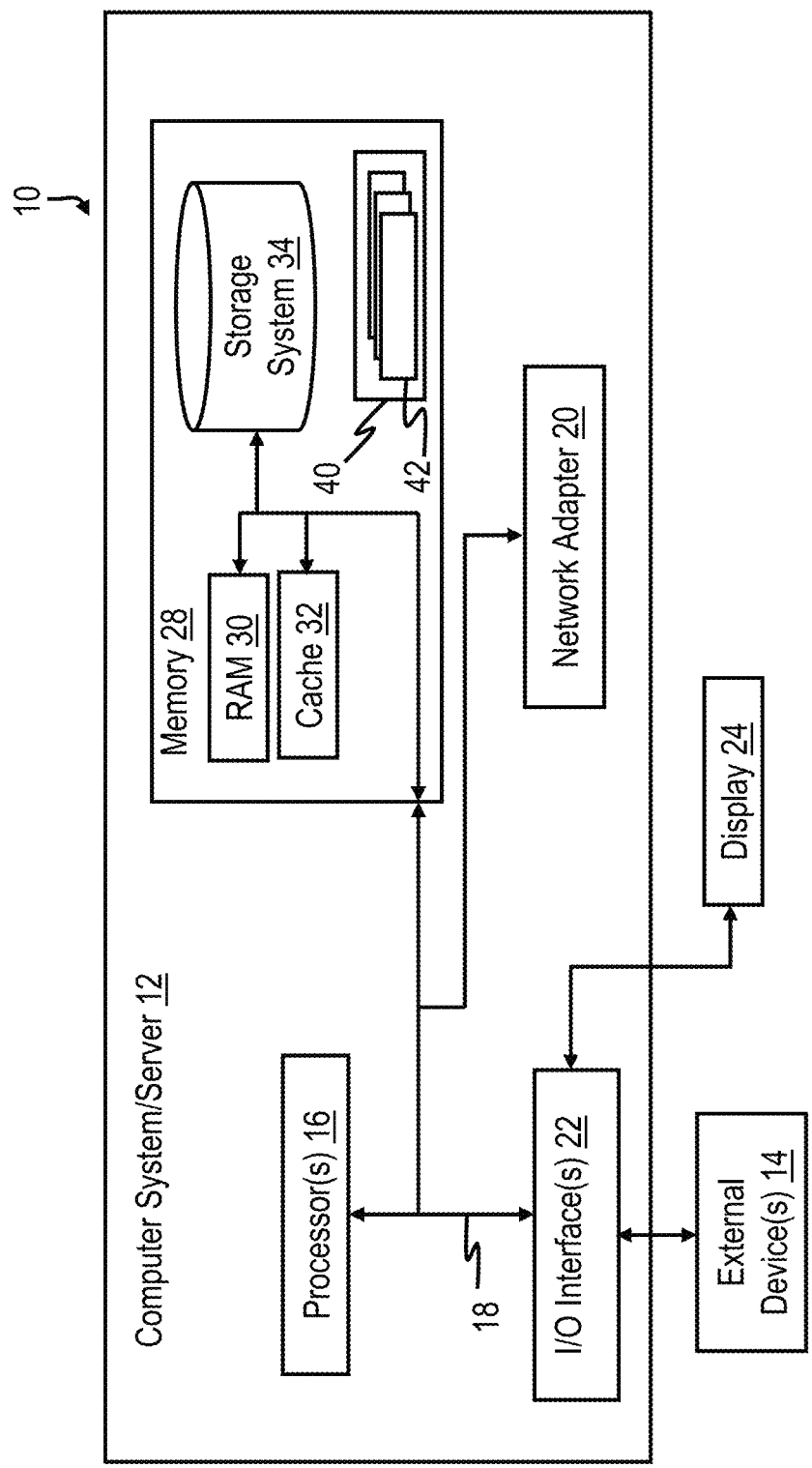
FIG. 1 depicts a relevant portion of an exemplary cloud computing node that is configured according to an embodiment of the present disclosure.

The illustrative embodiments provide a method, a data processing system, and a computer program product (embodied in a computer-readable storage medium) for improving cloud infrastructure backup in a shared storage environment.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter). Rapid elasticity means capabilities can be rapidly and elastically provisioned, in some cases automatically, to quickly scale-out and be rapidly released to quickly scale-in.

To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein.

Regardless, cloud computing node 10 is capable of being implemented and/or performing any of the functionality set forth herein. Cloud computing node 10 includes a computer system/server (or more generally a data processing system) 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more other devices that enable a user to interact with computer system/server 12, and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
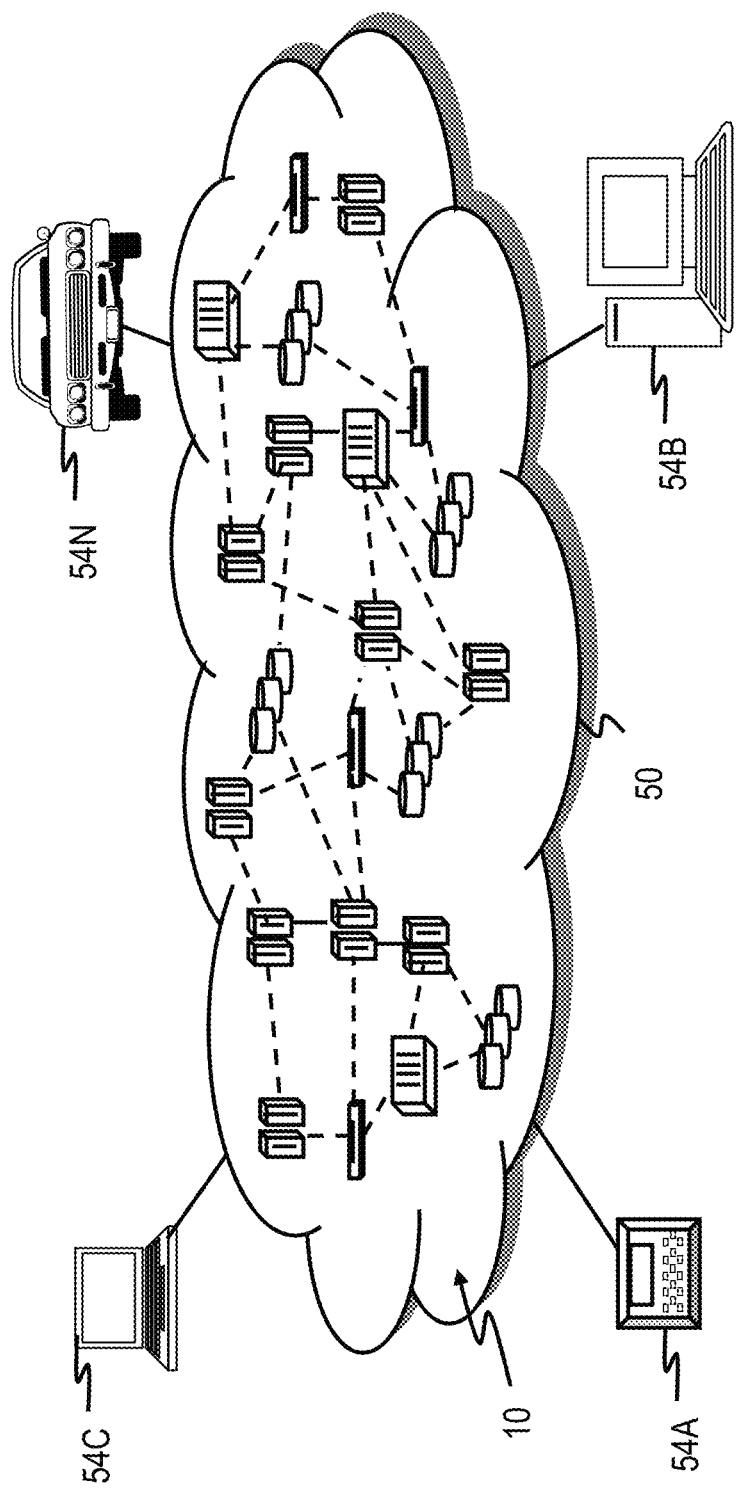
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
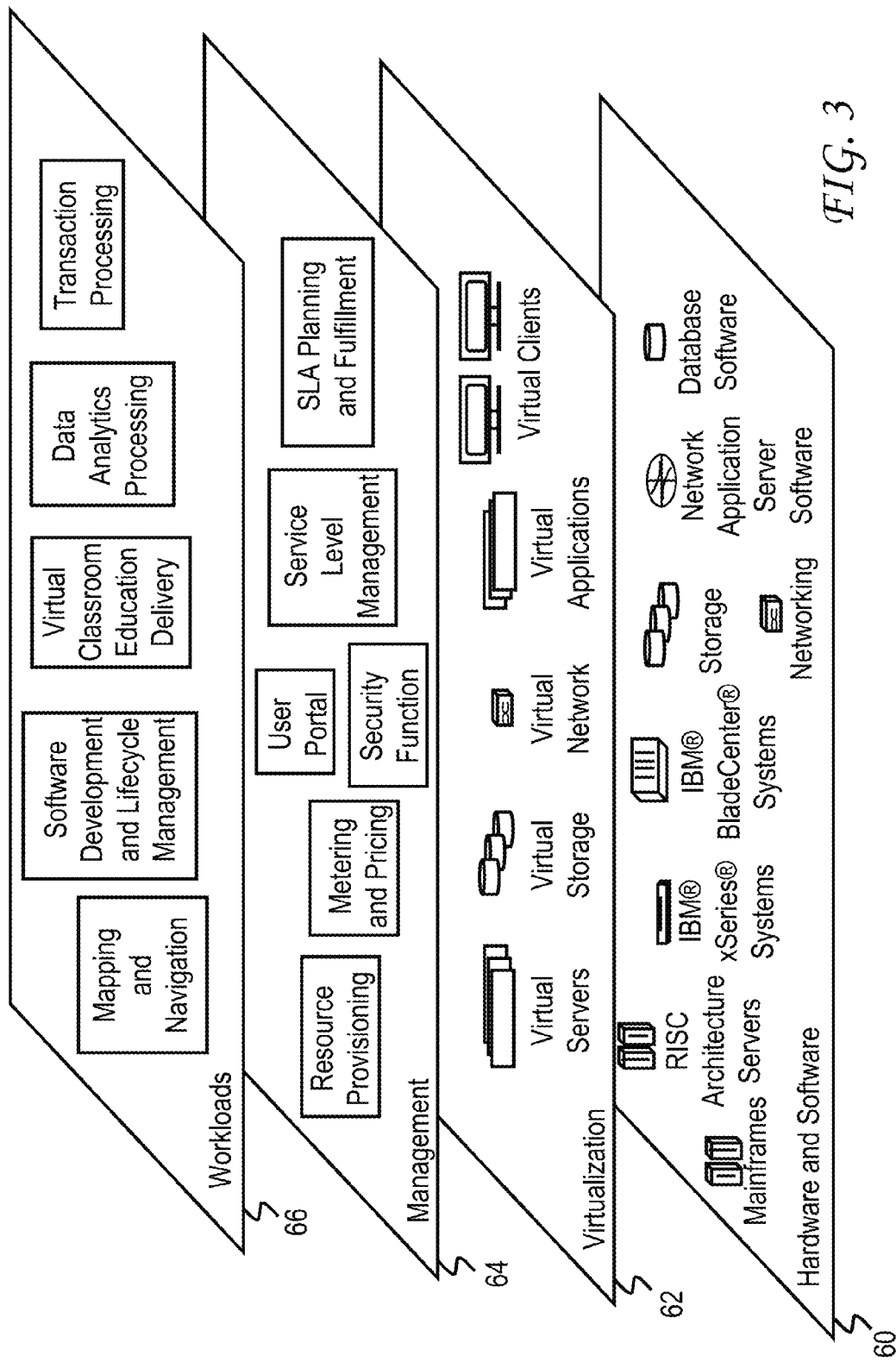
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM® pSeries® systems), IBM® xSeries® systems, IBM® BladeCenter® systems, storage devices, networks and networking components. As another example, the software components may include network application server software (e.g., IBM® WebSphere® application server software) and database software (e.g., IBM® DB2® database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. For example, the resource provisioning function may be performed for virtual machines (VMs) by one or more VMMs. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The term 'cloud infrastructure backup' refers to storing 'cloud management data' to a secure location. The term 'cloud infrastructure backup' does not encompass backing up cloud user/customer local files into a remote cloud. Cloud infrastructure backup is performed by cloud administrators for cloud lifecycle management. As one example, assume a system administrator of Company A, which offers cloud services, performs regular backups of different cloud management components to a backup server that is isolated from a given cloud. Also assume a cloud architecture of Company A includes: shared storage, e.g., because all physical machines (PM) do not have a local disk; and many internal cloud components are unreachable from external Internet services due to enterprise security issues. In this case, a cloud infrastructure backup requires temporary 'staging' of system data (or cloud management data) to a management node that can connect to a backup host via the Internet. During a 'staging' operation, all management tasks have conventionally been halted as all system administrative tasks have been required to quiesce until 'staging' is complete. In general, halting management tasks has conventionally been desirable to prevent data inconsistency during backup.

However, as Company A employs a shared storage model, many workloads on the same cloud may use the same storage resources as the backup process. In general, a staging delay during cloud infrastructure backup may increase significantly when customer input/output (I/O) intensive workloads are executing in parallel with the cloud infrastructure backup process. The resource contention between the cloud infrastructure backup process (initiated by a cloud provider/administrator) and executing workloads (initiated by cloud customers) may negatively affect the performance of the cloud infrastructure backup process by increasing the staging delay and stopping all regular administrative activities and monitoring services and may also negatively affect the performance of executing workloads and thus lead to QoS compliance issues.

According to one aspect of the present disclosure, interference avoidance may be employed to prevent interference between a cloud infrastructure backup process and executing workloads, e.g., VM workloads. For example, instead of employing a conventional fixed-window based cloud infrastructure backup process, a dynamic-window based cloud infrastructure backup process may be implemented that predicts I/O workload peaks, according to an embodiment of the present disclosure, to determine an optimal schedule for executing a cloud infrastructure backup process.

According to another aspect of the present disclosure, interference tolerance may be employed to reduce interference between a cloud infrastructure backup process and executing workloads when interference avoidance is not possible. For example, a storage medium differentiation approach based on I/O latency (a solid-state device (SSD) versus a hard-disk drive (HDD), an HDD with higher revolutions per minute (RPM) versus an HDD with a lower RPM, etc.) may be employed to reduce interference between a cloud infrastructure backup process and executing workloads. According to one embodiment, an interference policy that utilizes cost as a constraint may be employed. For example, an interference policy based approach may utilize a cache in a storage controller to temporarily hold data to reduce cost associated with employing multiple storage resources. In general, the disclosed techniques can speed-up system backup (i.e., cloud infrastructure backup) for many cloud products, e.g., IBM® PureApplication Systems. The disclosed techniques may also increase the performance of high-priority workloads that run concurrently with a cloud infrastructure backup on to shared storage.

Figure 4:
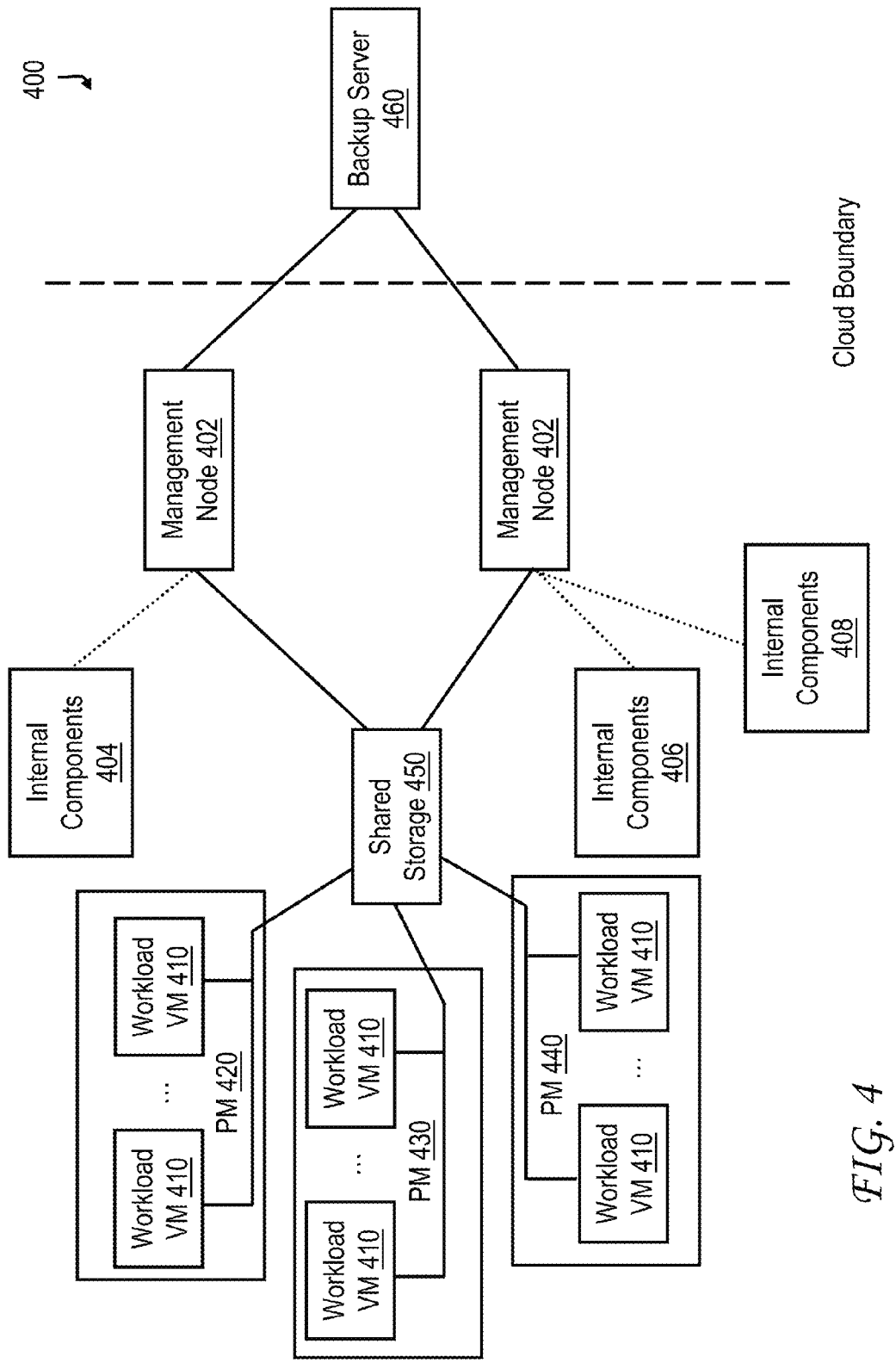
FIG. 4 is a diagram of a relevant portion of an exemplary virtualized system that illustrates a cloud environment with shared storage.

FIG. 4 depicts an exemplary cloud environment 400 where cloud management nodes 402 are directly connected to a backup server 460, but internal components 404, 406, and 408 (e.g., databases executing on management nodes 402 or applications executing on management nodes 402) are not directly connected to backup server 460. In FIG. 4, it should be appreciated that backup virtual machines (VMs) 410 (executing on physical machines (PMs) 420, 430, and 440) and management nodes 402 utilize shared storage 450, which may, for example, correspond to a storage area network (SAN). As backup is an inherently input/output (I/O) intensive process, backup can result in a significant increase in I/O operations (both in terms of I/O operations per second (IOPS) and megabytes per second (MB/s) of data transferred) on shared storage 450. In general, a backup process must scan all volumes in a backup set to determine what files have changed to create a delta disk since a last backup point. Data may also be compressed and/or encrypted before transfer to an off-cloud backup storage repository which may further increase I/O requirements.

According to one or more embodiments of the present disclosure, to mitigate I/O interference between cloud infrastructure backup and executing workloads, a two-step approach may be employed. According to at least one embodiment, for interference avoidance an attempt is made to perform system backup during a time window when no I/O intensive workloads are executing and for interference tolerance (if no such time window is available) a policy based approach is utilized that efficiently executes both the system backup and workloads concurrently. In general, the interference avoidance approach may employ dynamic backup schedule generation by cloud control software (e.g., executing on management node 402). For example, a cloud administrator may request that a system backup occur on or around a specific time of day. In this case, cloud control software determines the specific time that is optimal for the system to reduce I/O interference between management and user functions.

Figure 5:
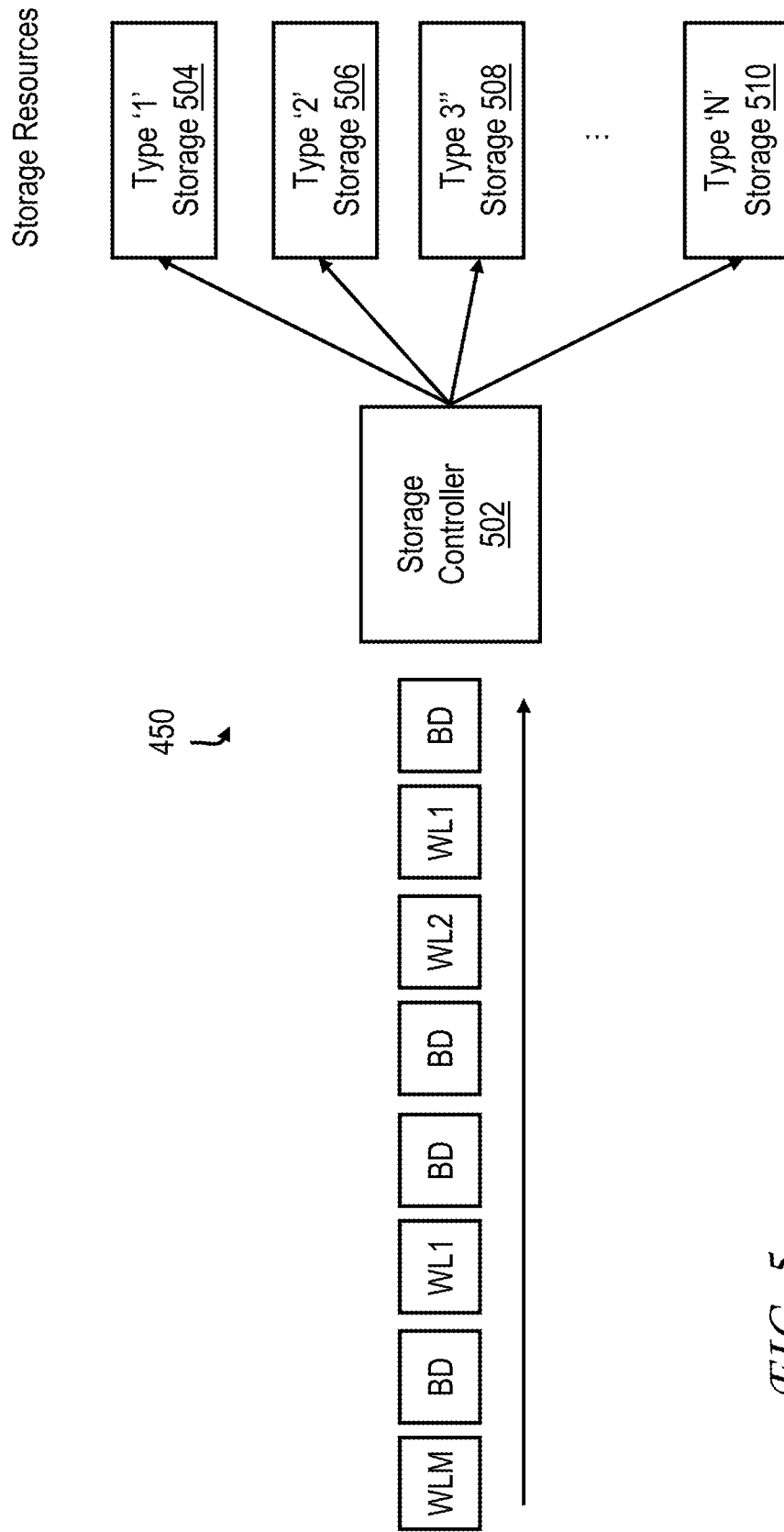
FIG. 5 is a diagram of a relevant portion of an exemplary virtualized system whose storage controller receives 'M' types of data (with 'K' priority levels) that are directed to 'N' types of storage resources, according to various embodiments of the present disclosure.

With reference to FIG. 5, a relevant portion of shared storage 450 is illustrated with 'M' types of data (with 'K' priority levels) being directed towards 'N' types of storage resources 504, 506, 508, and 510 (one or more SSDs, one or more HDDs, HDDs with different RPM, RAM disk, etc.) by storage controller 502. In this example, the types of data include workload (WL) data for workloads 1, 2 . . . , M and backup data (BD) of a cloud infrastructure backup process. In FIG. 5, a policy based approach is employed to determine how to route data operations to a class of storage medium. For example, storage controller 502 may use a policy to direct higher priority data towards a faster storage resource. As one example, in the case where only one type of workload data is executed concurrently with backing up system data and there is one SSD node and one HDD node in an associated storage pool, the backup data is assigned a higher priority than the workload data. In this case, storage controller 502 sends the backup data to the SSD (e.g., type 1 storage 504) and the workload data to the HDD (e.g., type N storage 510), as the SSD is faster than the HDD and the backup data has higher priority than the workload data. In one embodiment, if the workloads are already deployed and residing on the SSD, the workloads are live-migrated to the HDD. In the above example, it is assumed that the default SSD capacity on the cloud is sufficient to hold the system (infrastructure/management) data. In this case, when workloads share the SSD (where the backup data is supposed to be written) and backup has priority over workload, workloads are evicted via live migrations.

Figure 6:
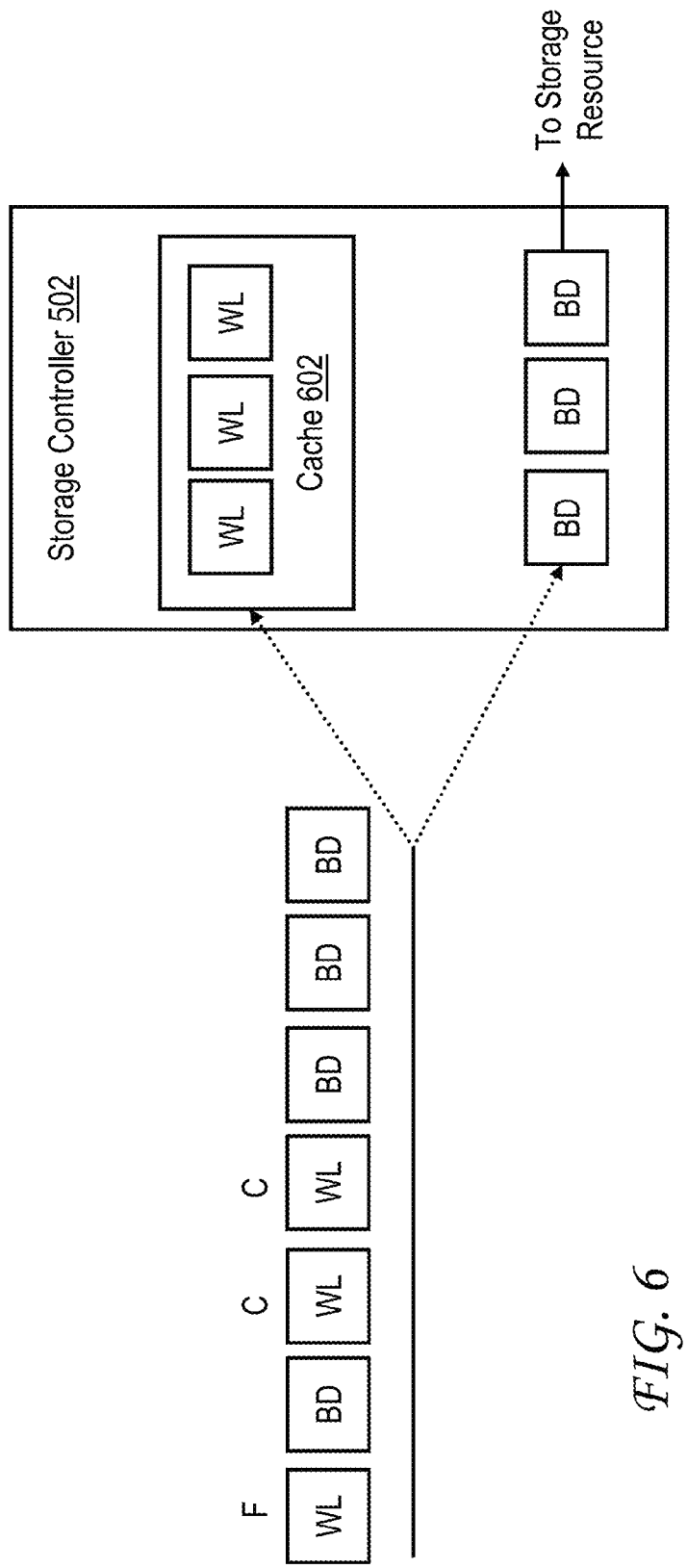
FIG. 6 is a diagram of a relevant portion of an exemplary virtualized system whose storage controller utilizes cache memory to stage workload data, according to various embodiments of the present disclosure.

When cost is a constraint, maintaining 'N' different types of storage resources may not be feasible. In this case, low priority data may be temporarily held in a cache within storage controller 502. With reference to FIG. 6, storage controller 502 is further illustrated as including cache 602, which is utilized to temporarily store workload (WL) data prior to sending the cached workload data to storage resources according to an embodiment of the present disclosure. As is illustrated in FIG. 6, while storage controller 502 caches workload data (WL), backup data (BD) is routed directed to a storage resource. In the example of FIG. 6, 'M' and 'K' are equal to two and 'N' is equal to one.

According to another embodiment, additional tagging (e.g., by cloud control software) can be used to denote when to cache workload data (WL) and when to flush workload data. As is illustrated, when tag 'C' is associated with workload data (WL) storage controller 502 caches the first two blocks of workload data received, and when tag 'F' is associated with workload data (WL) storage controller 502 flushes the three blocks of workload data in cache 602 to a storage resource. It should be appreciated that when backup data is large in size, cache 602 of storage controller 502 may become full with workload data. In this case, storage controller 502 flushes the workload data from cache 602 and holds the backup data (in a portion of cache 602 or another memory) while flushing the workload data from cache 602. It should be appreciated that the flush duration is generally small compared to the overall backup process and, in this case, backup performance is minimally impacted.

Figure 7:
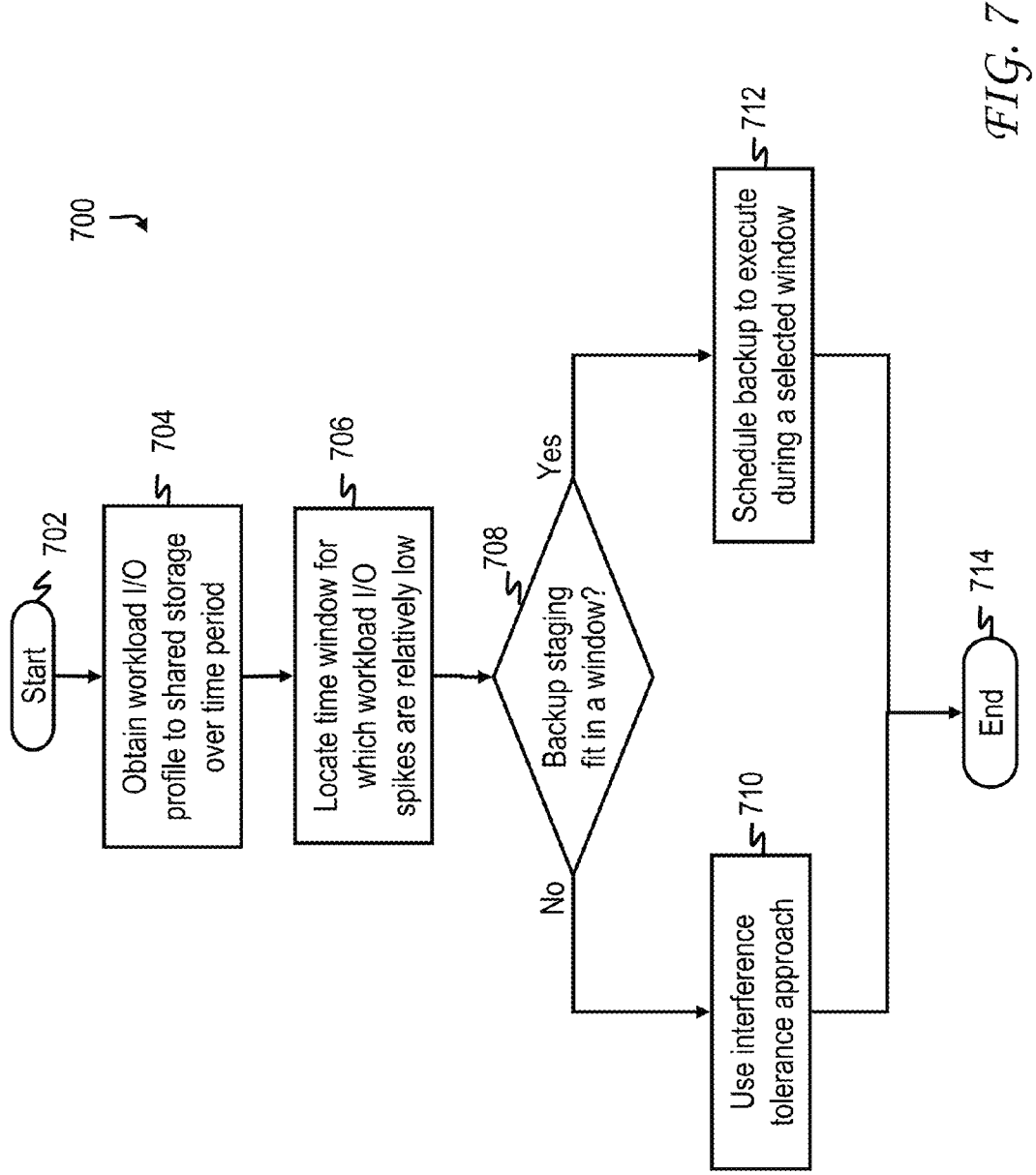
FIG. 7 is a flowchart of an exemplary process for staging cloud infrastructure data for backup to a backup server, according to various embodiments of the present disclosure.

With reference to FIG. 7 a process 700 for cloud infrastructure backup in a virtual environment utilizing shared storage, according to one aspect of the present disclosure, is illustrated. When cloud infrastructure backup and workloads must execute at the same time (i.e., interference avoidance is not possible), process 700 employs an interference tolerance approach for staging. According to one aspect, the interference tolerance approach utilizes a storage medium performance differentiation mechanism by leveraging different types of storage resources (e.g., RAM disk, SSD, or HDDs with different RPMs) in a common pool. As mentioned above, there can be 'N' different types of storage resources, and cloud control software may tag data and set a priority level for each type of data (e.g., there may be 'K' levels of priority). Process 700 may be implemented, for example, through the execution of one or more program modules 42 (see FIG. 1) of cloud control software residing in management layer 64 (see FIG. 3) by processor 16 (of computer system 12 of management node 402).

Process 700 may, for example, be initiated in block 702 in response to a user or cloud control software requesting a cloud infrastructure backup in a shared storage environment. Next, in block 704, processor 16 analyzes an I/O profile for storage controller 502 that was obtained over a given time period (e.g., days, weeks, or months). Then, in block 706, processor 16 identifies one or more time windows for which I/O workloads are relatively low. Next, in decision block 708, processor 16 determines whether a cloud infrastructure backup can be performed in any of the time windows identified (i.e., whether backup staging fits in one of the identified windows).

In response to backup staging fitting in one or more of the identified windows, control transfers from block 708 to block 712. In block 712, processor 16 schedules the cloud infrastructure backup to execute during a selected one of the time windows. For example, if multiple time windows are available that meet time requirements for staging the cloud infrastructure backup, the time window with the largest time may be selected. As another example, if multiple time windows are available that meet time requirements for staging the cloud infrastructure backup, the time window with the smallest time may be selected. Following scheduling staging of the cloud infrastructure backup in a time window, control transfers from block 712 to block 714, where process 700 terminates until a next cloud infrastructure backup is indicated.

In response to backup staging not fitting in one or more of the time windows in block 708, control transfers to block 710. In block 710, processor 16 employs an interference tolerance approach to concurrently schedule access to shared storage 450 for cloud infrastructure backup data with workload data. It should be appreciated that the cloud infrastructure backup data is staged for later transfer (by management node 402) to backup server 460. For example, processor 16 may employ a storage medium differentiation approach based on I/O latency (an SSD versus an HDD, an HDD with a higher RPM versus an HDD with a lower RPM, random access memory (RAM) disk, tape, etc.) to reduce interference between staging a cloud infrastructure backup and executing workloads that utilize shared storage 450. As one example, an interference policy that utilizes cost as a constraint may be employed. Further, an interference policy based approach may utilize cache 602 in storage controller 502 (see FIG. 6) to temporarily hold workload data for a single storage resource. Following block 710 control transfers to block 714, where process 700 terminates until staging of a next cloud infrastructure backup is indicated.

Accordingly, techniques have been disclosed herein that may advantageously increase the performance of workloads that run concurrently with staging a cloud infrastructure backup in a shared storage environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of cloud infrastructure backup in a virtualized environment, the method comprising:
    obtaining, using a data processing system, a workload input/output (I/O) profile of access to a shared storage over a time period;
    attempting, using the data processing system, to locate one or more time windows in the workload I/O profile for which a cloud infrastructure backup can be staged, wherein the cloud infrastructure backup backs up system data corresponding to one or more management abstraction layer functions that support a cloud computing environment;
    in response to determining the cloud infrastructure backup can be staged during at least one of the time windows, scheduling, using the data processing system, staging of the cloud infrastructure backup during a selected one of the time windows; and
    in response to determining the cloud infrastructure backup cannot be staged during at least one of the time windows, employing, using the data processing system, an interference tolerance approach for accessing the shared storage for active workloads and the cloud infrastructure backup during staging of the cloud infrastructure backup, wherein the interference tolerance approach allows both the active workloads and the cloud infrastructure backup to access the shared storage.

2. The method of claim 1, wherein the shared storage includes multiple different types of storage resources and the method further includes:
    assigning, using the data processing system, different priority levels to the multiple different types of storage resources; and directing, using the data processing system, data associated with the active workloads to a storage resource having a lower priority level and directing data associated with the cloud infrastructure backup to another storage resource having a higher priority level.

3. The method of claim 1, further comprising:
    transferring data associated with the cloud infrastructure backup to a backup server.

4. The method of claim 1, wherein the shared storage includes at least two of a solid-state drive, a first hard-disk drive configured to rotate at a first revolutions per minute (RPM), a second hard-disk drive configured to rotate at a second RPM different than the first RPM, a tape, and a random access memory disk.

5. The method of claim 1, wherein the shared storage includes a single type of storage
    resource and the method further includes:
    initially directing, using the data processing system, workload data associated with the active workloads to a cache memory of a storage controller; and
    initially directing, using the data processing system, the system data associated with the cloud infrastructure backup to the single type of storage resource.

6. The method of claim 5, wherein the storage resource includes one of a solid-state drive, a first hard-disk drive configured to rotate at a first revolutions per minute (RPM), a second harddisk drive configured to rotate at a second RPM different than the first RPM, a tape, and a random access memory disk.

7. The method of claim 5, further comprising:
    in response to the cache memory being full or receipt of a flush tag by the storage controller, stalling storing, using the data processing system, of the system data in the storage resource and flushing, using the data processing system, the workload data from the cache memory to the storage resource; and in response to the flushing the workload data from the cache memory to the storage resource being complete, resuming, using the data processing system, storing the system data in the storage resource.

8. The method of claim 1, wherein system data associated with the cloud infrastructure backup has a higher priority than workload data associated with the active workloads, and wherein first data associated with a first one of the active workloads has a higher priority than second data associated with a second one of the active workloads.

9. The method of claim 1 wherein at least one of the one or more management abstraction layer functions is selected from the group consisting of a resource provisioning function, a metering and pricing function, a security function, a user portal function, a service level management function, and a service level agreement planning and fulfillment function.

\* \* \* \* \*